United States Patent [19]
Weber et al.

[11] Patent Number: 5,761,069
[45] Date of Patent: Jun. 2, 1998

[54] INTEGRATED SYSTEM FOR CLEANING MEDICAL INSTRUMENTS

[75] Inventors: Frank J. Weber, Doylestown; Daniel Charyna, Bensalem, both of Pa.

[73] Assignee: Custom Ultrasonics, Inc., Doylestown, Pa.

[21] Appl. No.: 556,031

[22] Filed: Nov. 9, 1995

[51] Int. Cl.$^6$ .................................................. G06F 19/00
[52] U.S. Cl. ...................... 364/478.01; 364/500; 422/105
[58] Field of Search ........................ 364/478.01, 500, 364/550, 551.01, 188, 189, 146, 496, 131–139; 422/1, 105–116, 119, 295, 299, 300

[56] References Cited

U.S. PATENT DOCUMENTS

| | | | |
|---|---|---|---|
| 1,316,612 | 9/1919 | Hay. | |
| 3,087,210 | 4/1963 | Neiss | 21/93 |
| 3,407,029 | 10/1968 | Krahe | 21/93 |
| 3,537,825 | 11/1970 | Adamik | 23/290 |
| 3,579,290 | 5/1971 | Pickstone | 21/2 |
| 3,751,225 | 8/1973 | Karlson | 21/91 |
| 3,801,278 | 4/1974 | Wagner et al. | 21/86 |
| 3,982,893 | 9/1976 | Joslyn | 21/2 |
| 4,067,691 | 1/1978 | McGady et al. | 21/56 |
| 4,127,384 | 11/1978 | Fahlvik et al. | 422/109 |
| 4,164,538 | 8/1979 | Young et al. | 422/26 |
| 4,195,061 | 3/1980 | Kalasek | 422/109 |
| 4,261,950 | 4/1981 | Bainbridge et al. | 422/26 |
| 4,296,067 | 10/1981 | Nasman et al. | 422/26 |
| 4,798,292 | 1/1989 | Hauze | 206/439 |
| 4,865,814 | 9/1989 | Childress | 364/474.16 |
| 4,923,681 | 5/1990 | Cox et al. | 422/116 |
| 4,938,933 | 7/1990 | Perrot | 422/292 |
| 4,988,485 | 1/1991 | Bene | 422/292 |
| 5,091,343 | 2/1992 | Schneider et al. | 422/297 |
| 5,184,633 | 2/1993 | Langford | 134/57 |
| 5,277,875 | 1/1994 | Albright et al. | 422/109 |
| 5,405,587 | 4/1995 | Fernandez et al. | 422/292 |
| 5,535,141 | 7/1996 | Lussi | 364/140 |
| 5,559,691 | 9/1996 | Monta et al. | 364/188 |

FOREIGN PATENT DOCUMENTS

| | | |
|---|---|---|
| 1342147 | 2/1964 | France. |
| 207047 | 6/1959 | Germany. |

OTHER PUBLICATIONS

Pages taken from publicatin entitled System 83 from Custom Ultrasonics published by Custom Ultrasonics, Inc., the assignee of the present invention; date unknown.

*Primary Examiner*—Joseph Ruggiero
*Attorney, Agent, or Firm*—Caesar, Rivise, Bernstein, Cohen & Pokotilow, Ltd.

[57] ABSTRACT

An integrated system for reprocessing contaminated medical instruments, e.g., scopes, surgical instruments, scope accessories, etc. The system includes plural, e.g., four, instrument processing units and a remotely located common controller for effecting the simultaneous control of each processing unit. Each processing unit includes various components, e.g., pumps, solenoids, valves, sensors etc., and a processing chamber. Each chamber is adapted for receiving a medical instrument carrier to which plural medical instrument in need of processing are connected. The controller includes a microprocessor, an associated memory storing a control program, a keyboard, a video display, and a printer. The control program establishes respective protocols of processing steps for effecting the reprocessing of the medical instruments in each of the reprocessing units by the microprocessor controlling the operation of the various components of the processing units via an electrical interface. The respective protocols are preestablished in accordance with the specific type of medical instrument to be reprocessed in the associated reprocessing unit. A database of information regarding previously processed instrument is stored within the system. Operation of the system can be monitored by viewing the video display. That display is selectable to graphically depict the various operational steps being accomplished in one or more of the processing units as those units are operated.

26 Claims, 12 Drawing Sheets

INTEGRATED SYSTEM FOR CLEANING MEDICAL INSTRUMENTS

BACKGROUND OF THE INVENTION

This invention relates generally to devices for reprocessing contaminated medical instruments before such instruments are reused in a clean environment, such as in the operating room of a hospital. The term "reprocessing", as used herein constitutes the washing, disinfecting, sterilizing and/or pasteurizing of such instruments. In particular, this invention relates to an integrated system that enables the distributed control of a plurality of differentiated reprocessing units through the use of a common computer based controller and associated computer programs.

Recent advancements in medical science have provided many new medical procedures and new instruments for use in those procedures. To a large extent, these medical instruments are designed without the thought of reprocessing and reuse in mind. That is, in the past, rather than attempting to decontaminate and reuse medical instruments, it has been common for hospital personnel to simply dispose of medical instruments after a single use in a procedure. The advantage of disposal after first use is the low risk of cross-contamination and cross-infection. However, as hospital costs have escalated, the practice of disposal of medical instruments after a single use has become prohibitively expensive, forcing many hospitals to reexamine this practice and consider alternatives that enable the reuse of medical instruments.

Some fully automated devices for reprocessing medical instruments for reuse have become generally available and are commonly relied upon by hospitals to safeguard patients and hospitals employees from exposure to infection and cross-contamination. Such prior art reprocessing units are manufactured by several different companies including, Custom Ultrasonics, Inc., of Ivyland, Pa., the assignee of the present invention and application.

For example there are reprocessing units in the prior art arranged for cleaning, disinfecting and sterilizing flexible "scopes", e.g., upper and lower gastrointestinal scopes, colonoscopes and duodescopes. These prior art reprocessing units are arranged to operate in accordance with a predetermined protocol of reprocessing steps. The predetermined protocol is based upon the specific cleaning requirements of the particular instruments being cleaned. The reprocessing steps are precisely timed and sequenced to assure optimal results, based upon the correct combination of water temperature and use of detergent and chemical agents. An exemplary protocol for cleaning a flexible scope includes the following reprocessing steps, after the scope has been placed in the cleaning basin of the reprocessing unit: (1) wash internal and external surfaces of flexible scope with a measured detergent-water mixture for a preset period of time; (2) activate ultrasonic crystals while washing; (3) drain detergent-water mixture after the wash cycle is completed; (4) after draining, rinse internal and external surfaces of flexible scope with water at a preset temperature for a preset period of time; (5) introduce and circulate disinfectant over and through flexible scopes for a preset period of time; (6) drain disinfectant from wash basin; (7) after draining of the disinfectant is complete, rinse the flexible scopes with water; and (8) re-rinse flexible scopes with water.

Under the prior art reprocessing units, parameters such as wash and rinse cycle time, chemical immersion cycle time and water temperature are preset by the reprocessing unit manufacturer and cannot be altered by an end user of the system, e.g., a hospital worker or nurse.

Under the prior art, the reprocessing unit is typically provided with a dedicated controller that carries out the predetermined protocol of processing steps such as those enumerated above. Such a prior art controller contains a memory device, e.g., an EPROM, which stores the reprocessing steps as instructions, and a central processing unit, e.g., an 8085 microprocessor, that executes the instructions stored on the EPROM. Prior art reprocessing units also typically comprise a variety of mechanical components, e.g., pumps, solenoid valves, ultrasonic transducers, heaters and probes that perform each of the various reprocessing steps. Each of these mechanical components is electronically connected to the controller to execute instructions issued by the controller in a manner that is well known to those skilled in the prior art.

The design of these prior art reprocessing units varies considerably based upon the type of medical instrument being reprocessed. In other words, no prior art reprocessing unit will meet the reprocessing requirements of all types of medical instruments. For example, surgical instruments such as scissors comprise moving parts that must be lubricated during reprocessing to ensure continued smooth operation. Therefore, a reprocessing unit suited for cleaning surgical instruments must be designed to provide a "lubrication" step in its reprocessing protocol, and to provide internal components, e.g., pipes, valves and pumps, etc., to enable the addition of a lubricant during the lubrication step.

As another example, because flexible scopes, such as those mentioned previously in this specification, often contain electronic instrumentation and optic fibers, they cannot be subjected to high powered ultrasonic cleaning without risking damage to the delicate fiber optic instrumentation. Therefore, devices for reprocessing fiber optic scopes must be custom designed to provide a mild level of acoustical energy during cleaning. Other types of reprocessing units may utilize a more effective high powered ultrasonic cleaning step where there is no concern for damaging delicate instrumentation.

Additionally, several governmental agencies have issued guidelines establishing requirements for reprocessing particular types of medical instruments. As an example, such guidelines often require that certain types of medical instruments be washed and sterilized using a chemical disinfectant, while other types of instruments need only be washed. Therefore the design of reprocessing units and the reprocessing steps they perform must conform with such guidelines.

There are several drawbacks with the prior art reprocessing units. For example, because of innovation and advancements in the design of various types of medical instruments, reprocessing requirements for these instruments is rapidly changing. Accordingly, it is often necessary to adjust the protocol of reprocessing steps to assure that cleaning is performed in accordance with new requirements. Such adjustments include adjustments to cycle times, water temperature, chemical disinfectant temperature, etc. Under the prior art, implementation of changes to the predetermined protocol has proven to be both time consuming and costly. In particular, the memory device, i.e., the EPROM, containing the protocol of reprocessing instructions cannot be altered during the normal operation of the reprocessing unit. Rather, to modify the reprocessing protocol, it is necessary to shut down the reprocessing unit, access and remove the memory device which may be hardwired, soldered or plugged into a printed circuit board, and either reprogram the removed memory device or replace it with a preprogrammed device. The implementation of such changes is generally not performed by hospital personnel, but rather by programming technicians sent to the hospital by the manufacturer. Such a process is quite expensive and results in considerable downtime for the reprocessing equipment.

Secondly, the prior art reprocessing units provide no means for storing historical data associated with each load of instruments reprocessed, including, for example, instrument serial numbers, patient name, patient identification, identification of one doctor using the instrument, time stamping, and information relating to service provided for the instrument. Such use of historical information would assist hospitals in locating the source of cross-contamination and cross-infection which inherently exists when medical instruments are being used and reprocessed over and over again.

Third, the prior art reprocessing units do not provide information in a "user friendly" manner. In this regard prior art reprocessing units are typically provided with a control panel having a plurality of LED's (light emitting diode). Each LED represents a particular mechanical component that is operating during the reprocessing protocol. For example, when a drain valve opens to allow water to drain from the reprocessing basin, the LED corresponding to the drain valve illuminates. Similarly, when the power generator enabling an ultrasonic cleaner becomes operative, the corresponding LED becomes illuminated to indicate the operation of this component. The use of LED's to display information in this manner is of little or no use in determining relevant information, such as how much time is remaining before reprocessing is completed, or what additional processing step must be performed before reprocessing is completed. By providing such in-process information, time spent by users waiting for reprocessing to be completed could be spent more productively performing other tasks.

Fourth, the prior art reprocessing devices do not provide any means for controlling the simultaneous operation and monitoring of a plurality of reprocessing units from a single controller in a distributed manner. In other words, under the prior art, the control of each reprocessing unit is integral with that unit.

OBJECTS OF THE INVENTION

It is a general object of the present invention to provide an integrated system for reprocessing medical instruments which overcomes the disadvantages of the prior art.

It is another object of the present invention to provide an integrated system for reprocessing medical instruments wherein a plurality of reprocessing units are operated by a common controller.

It is another object of the present invention to provide an integrated system for reprocessing medical instruments using plural reprocessing units or chambers and wherein the reprocessing units/chambers are operated simultaneously.

It is another object of the present invention to provide an integrated system for reprocessing medical instruments having plural reprocessing units wherein the design and operation of each reprocessing unit in the system is differentiated based upon the types of medical instruments being reprocessed.

It is another object of the present invention to provide an integrated system for reprocessing medical instruments having plural reprocessing units under control of a common controller, to control the operation of those units by means of programmable custom application software rather than by a fixed program in a memory storage device, such as an EPROM.

It is another object of the present invention to provide an integrated system for reprocessing medical instruments having plural reprocessing units wherein the selection and sequence of reprocessing steps performed by each reprocessing unit is controlled by the common controller, rather than by intervention of an end user.

It is another object of the present invention to provide an integrated system for reprocessing medical instruments using plural reprocessing units wherein the selection and sequence of reprocessing steps performed at each reprocessing unit is dictated by a predetermined protocol resident in custom application software.

It is another object of the present invention to provide an integrated system for reprocessing medical instruments wherein the predetermined protocol of reprocessing steps effected by the system cannot be altered by an end user of the system.

It is another object of the present invention to provide an integrated system for reprocessing medical instruments using plural reprocessing units wherein each reprocessing unit in the system effects the reprocessing of medical instruments by the use of chemical agents and detergents.

It is another object of the present invention to provide an integrated system for reprocessing medical instruments wherein the protocol reprocessing steps is partially determined by manufacturers' instructions provided with the chemical agents and detergents.

It is another object of the present invention to provide an integrated system for reprocessing medical instruments wherein the system provides a database enabling the user to obtain historical information regarding previous reprocessing procedures carried out by the system.

It is another object of the present invention to provide an integrated system for reprocessing medical instruments using plural reprocessing units and a common controller, wherein that controller can be located in an area that is remote from the area in which contaminated medical instruments are being cleaned.

SUMMARY OF THE INVENTION

These and other objects of the instant invention are achieved by providing an integrated system for reprocessing contaminated medical instruments. The system basically comprises at least two reprocessing units, an electronic controller, and a control program for the electronic controller means.

Each of the reprocessing units is adapted for receiving therein a medical instrument carrier. The medical instrument carrier is in turn adapted to receive at least one of a predetermined type of contaminated medical instruments for the reprocessing thereof.

The electronic controller means includes electronic processor means and associated memory means. The electronic controller means is operably coupled to each of the reprocessing units to control the operation thereof.

The control program is arranged for disposition in the memory means and serves to establish respective protocols of processing steps for effecting the reprocessing of the medical instruments in each of the reprocessing units. The respective protocols are preestablished in accordance with the specific type of medical instrument to be reprocessed in the associated reprocessing unit.

In accordance with one preferred aspect of this invention the controller includes visual display means for providing a visual display of various operating conditions of the processing units of the system as they are operated by the controller. The controller can control the operation of all of the unit simultaneously or of selected ones of those units. The visual display is arranged for selectively displaying graphically the operation of one or more of the processing units.

In accordance with another aspect of this invention, a database of information relating to the processing of the medical instruments is stored in the system for retrieval of selected information therefrom.

DESCRIPTION OF THE DRAWINGS

Other objects and many attendant features of this invention will become readily appreciated as the same becomes better understood by reference to the following detailed description when considered in connection with the accompanying drawings wherein.

DETAILED DESCRIPTION OF THE PREFERRED EMBODIMENTS

Figure 1:
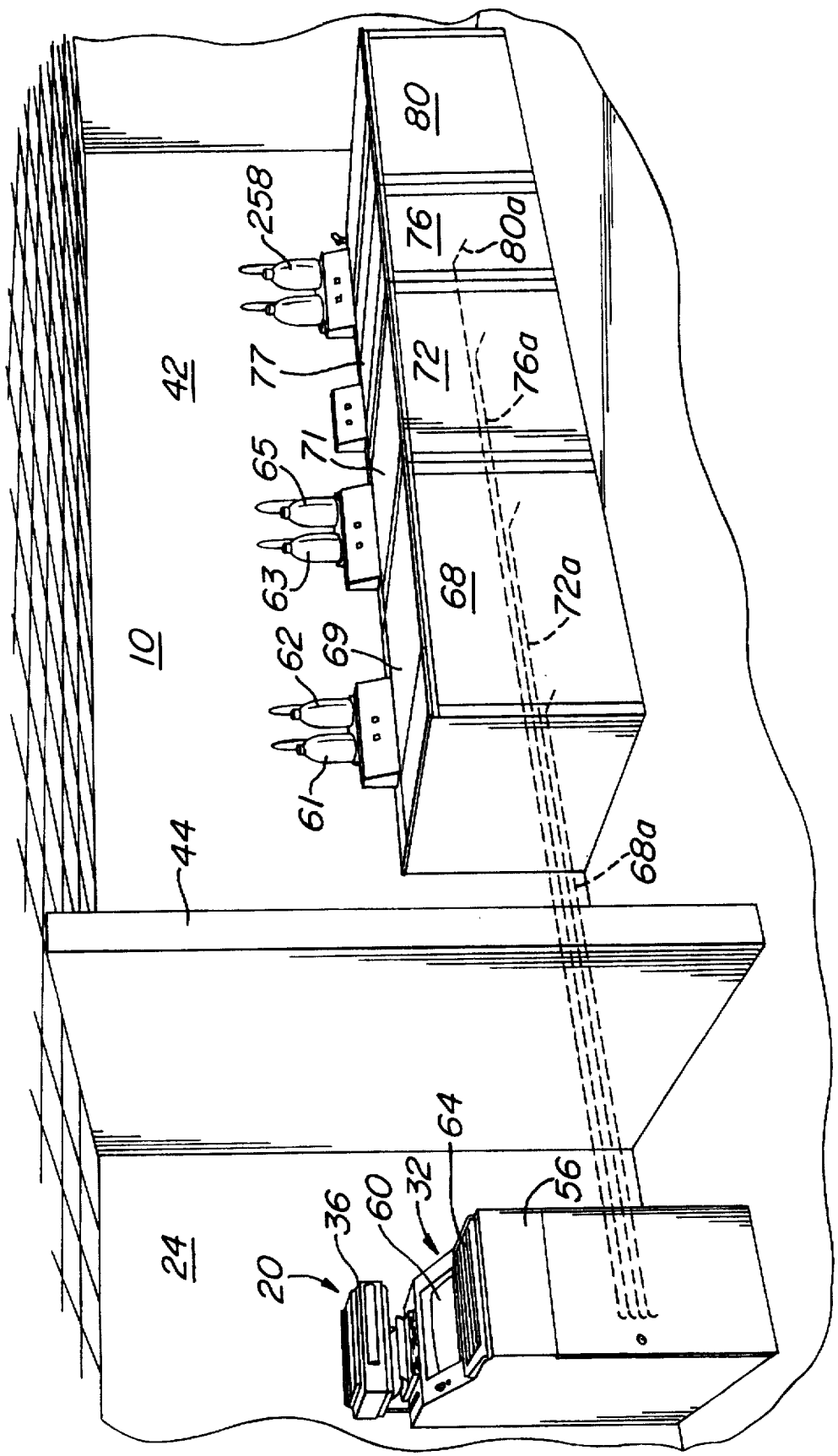
FIG. 1 is an isometric view showing a computer workstation and four processing units forming the integrated system of the present invention.

Referring now to various figures of the drawings where like reference numerals refer to like parts, there is shown in FIG. 1, an embodiment of the integrated system 10 for reprocessing medical instruments constructed in accordance with this invention.

As will be discussed later, the system 10 comprises a plurality of reprocessing units, each of which may be arranged for reprocessing a different type of medical instrument. That is, one reprocessing unit may be arranged for reprocessing respiratory therapy equipment, another may be arranged for reprocessing instruments used in laparoscopic surgery. Still another of the reprocessing units in the system may be arranged for reprocessing flexible fiber optic scopes.

Because the system 10 is capable of reprocessing such a variety of different types of medical instruments, it may be suitably situated in a single central location of a hospital, e.g., a central processing center or central services, thus improving the management of reprocessing of medical instruments and reducing the risk of contamination and the spread of infection or may be distributed so that portions thereof may be located in several rooms.

As shown in FIG. 1, the integrated system 10 comprises a controller workstation 20 located in a first room 24. The controller workstation 20 is remote from each of the reprocessing units in the system 10, rather than being an integral part of each reprocessing unit. The controller workstation 20 serves as an interface between the system 10 and the user. The controller workstation 20 basically comprises a general purpose computer 32, e.g., personal microcomputer, and a printer 36 that is housed in a cabinet 56. The microcomputer 32 utilized in the controller workstation 20 comprises a graphical user interface, an 80486 or more powerful type microprocessor and between eight and sixteen megabytes of random access memory (RAM). The controller workstation also includes a printer 36, a color monitor 60, and a high quality keyboard 64. Additionally, the microcomputer 32 possesses a hard disk drive and at least one floppy disk drive to enable the execution of custom application software contained on one or several floppy diskettes in accordance with the present invention.

A copy of the entire source code of the custom application software utilized in accordance with this invention is attached hereto in Appendix A. The custom application software of the present invention can be written in any one of a number of suitable programming language products sold under various trademarks. One such programming language product particularly suited for the system of the present invention is sold under the name Borland C++ by Borland International of Scotts Valley, Calif.

In accordance with this invention, the controller workstation 20 is equipped with any one of several operating systems that enables the operation and use of the custom application software. One such operating system is sold under the name MS-DOS by Microsoft Corporation.

As shown in FIG. 1, the controller workstation 20 is linked to four reprocessing units 68, 72, 76 and 80, located in a second room 42 by means of a plurality of communications cables 68a, 72a, 76a and 80a. The first room 24 is separated from the second room 42 by means of a wall 44 so as to enable a user of the system 10 to control and monitor the reprocessing of medical instruments without exposure to contamination or infectious disease. At their first end, the communications cables are connected to input/output cards (not shown) that are installed in the microcomputer 32. The input/output cards are installed in the microcomputer 32 and linked to communications cables 68a, 72a, 76a and 80a in a manner that is well known to those skilled in the art. The input/output cards may be of any suitable construction. Particularly effective input/output cards that may be utilized in the microcomputer 32 are sold by Computer Boards, Inc. of Mansfield, Mass. under the model numbers CIO-DAS-08, CIO-EXP-16 and CIO-DIO-24H.

At its second end, each communications cable 68a, 72a, 76a and 80a is connected to a plurality of relays housed within a relay interface (not shown) located within each of the reprocessing units 68, 72, 76 and 80. Each relay interface (not shown) comprises a number of relays corresponding to the number of mechanical components contained within the reprocessing unit in which the relay interface is housed. The relay interface (not shown) enables the transmission of current and the sending and receiving of electrical signals between the microcomputer 32 and each of the mechanical components located within each reprocessing unit. The relay interface (not shown) may be of any suitable construction.

The controller workstation 20 controls the operation of each of the reprocessing units, 68, 72, 76 and 80 by means of custom application software provided in accordance with this invention. The custom application software is stored on the hard drive of the microcomputer 32.

In accordance with the present invention, each of the reprocessing units in the system may be differentiated from one another, i.e., each may be designed differently to perform a different reprocessing protocol. Alternatively, one or more of the reprocessing units in the system 10 may be similarly designed for cleaning the same type of medical devices by following the same protocol of reprocessing steps. In accordance with the present invention, the plurality of differentiated reprocessing units 68, 72, 76 and 80 may be controlled and monitored simultaneously from the controller workstation 20 in a manner to be described in detail below.

The particular types of reprocessing units utilized in this specification, i.e., 68, 72, 76 and 80, are manufactured and sold by Custom Ultrasonics, Inc., the assignee of the present invention. In particular, the reprocessing unit 68 is sold by Custom Ultrasonics, Inc. under the model name System 81+z. The reprocessing unit 72 is sold under the model name System 81+y. The reprocessing unit 76 is sold under the model name System 82+ and the reprocessing unit 80 is sold under the model name System 83+dt. In addition, Custom Ultrasonics, Inc. manufactures a number of other types of reprocessing units for reprocessing other types of medical instruments that are arranged to be utilized in the system 10 in accordance with the present invention. These other reprocessing units are sold under the model names System 81, System 81p, System 81x, System 81z, System 83, System 83d, System 83r and System 83u.

It should be understood that the invention of this application is not limited to the particular types of reprocessing units 68, 72, 76 and 80 disclosed as comprising the system 10. Rather, other types of reprocessing units, including those reprocessing units manufactured and sold by Custom Ultrasonics, Inc. identified above, e.g., System 81, System 81p, System 81x, System 81z, System 83, System 83d, System 83r and System pb 83u, may also be utilized in the system 10 in accordance with this invention. Additionally, reprocessing units manufactured by companies other than Custom Ultrasonics, Inc. may be utilized in accordance with the present invention.

While FIG. 1 illustrates the system 10 as comprising four reprocessing units, it should be understood that such is merely exemplary. Thus, the system 10 may include any number of reprocessing units, e.g., two, four, eight, sixteen, etc., to be operated from a common central controller in a distributed manner without departing from this invention.

For use of the system 10, the user, e.g., nurse or hospital staff person, inserts one or several diskettes containing the custom application software of this invention into the disk drive slot of the microcomputer 32. After inputting some preliminary commands by means of the keyboard 64 in response to visual prompts on the controller's video display 60, as produced by the custom software running in the microprocessor, the user is provided with a list of menu options including MASTER DATA, RUN CU, REPORTS and MISCELLANEOUS. By selecting the RUN CU option, the user is presented with the display screen on the monitor 60 like that shown in FIG. 2. As can be seen therein, the display screen is divided into four quadrants, i.e., an upper-left quadrant (hereinafter referred to as the "first bay" 116), an upper-right quadrant (hereinafter referred to as the "second bay" 120), a lower-left quadrant (hereinafter referred to as the "third bay" 125) and a lower-right quadrant (hereinafter referred to as the "fourth bay" 128).

Figure 2:
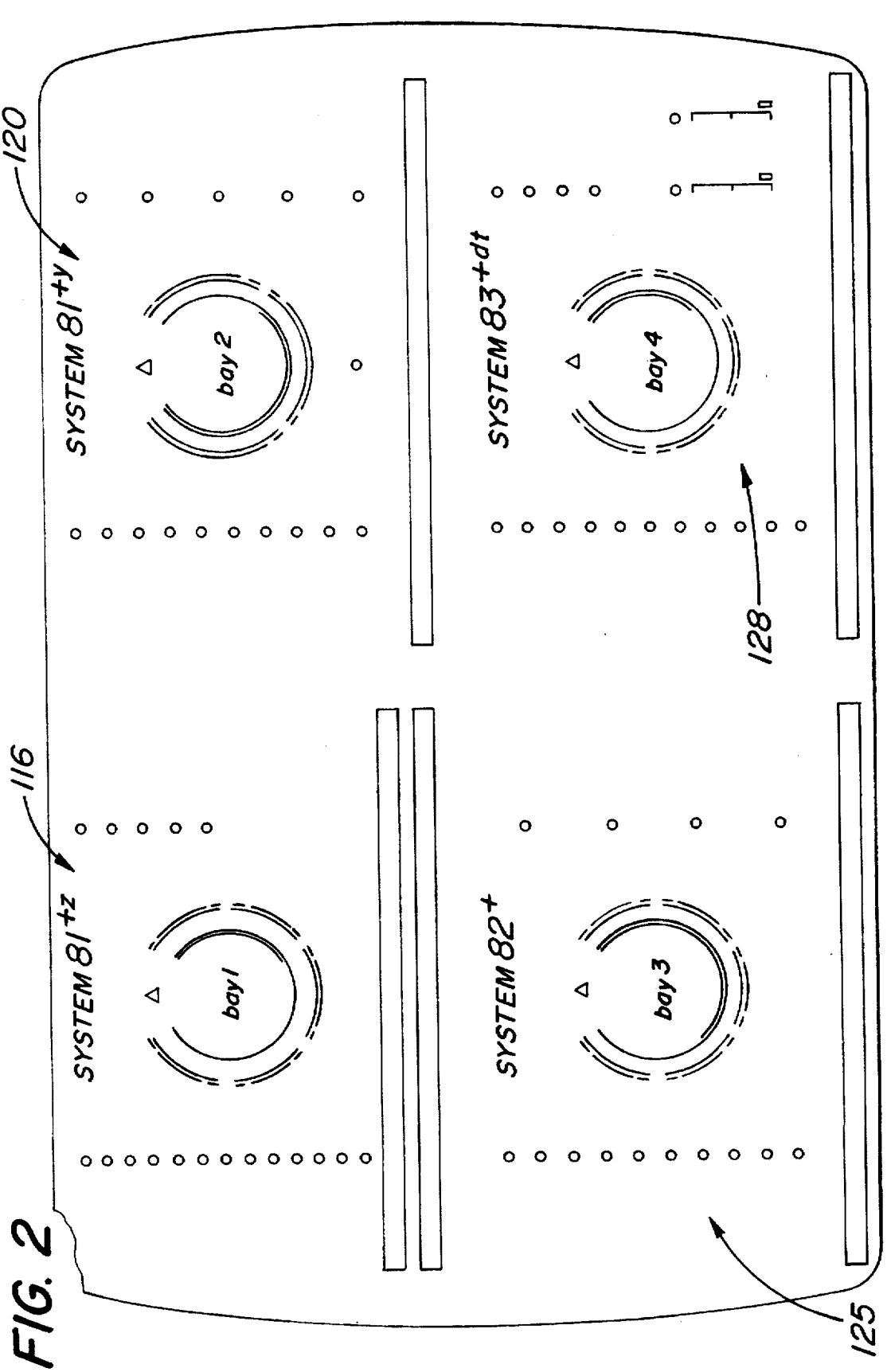
FIG. 2 is an illustration of one exemplary video screen display produced by the custom application software forming a portion of the system on a video display also forming a portion of the system of the present invention.

Each of the four bays 116, 120, 125 and 128, comprises a graphical representation of the operation of one of the four reprocessing units comprising the system 10 as shown in FIG. 1. That is, the first bay 116 presents a graphical representation of the operation of reprocessing unit 68, the second bay 120 presents a graphical representation of the operation of reprocessing unit 72, the third bay 125 displays a graphical representation of the operation of reprocessing unit 76 and the fourth bay 128 presents a graphical representation of the operation of reprocessing unit 80. Because the display screen of FIG. 2 is arranged in a plurality of bays, it enables the user of the system 10 to control and monitor the operation of up to four types of reprocessing units simultaneously. It should be understood that the number of bays illustrated in FIG. 2 is merely exemplary. Thus, any number of bays, e.g., two, four, eight, sixteen, etc., could be produced on the video screen representing a corresponding number of units under common control without departing from the scope of this invention.

Figure 3:
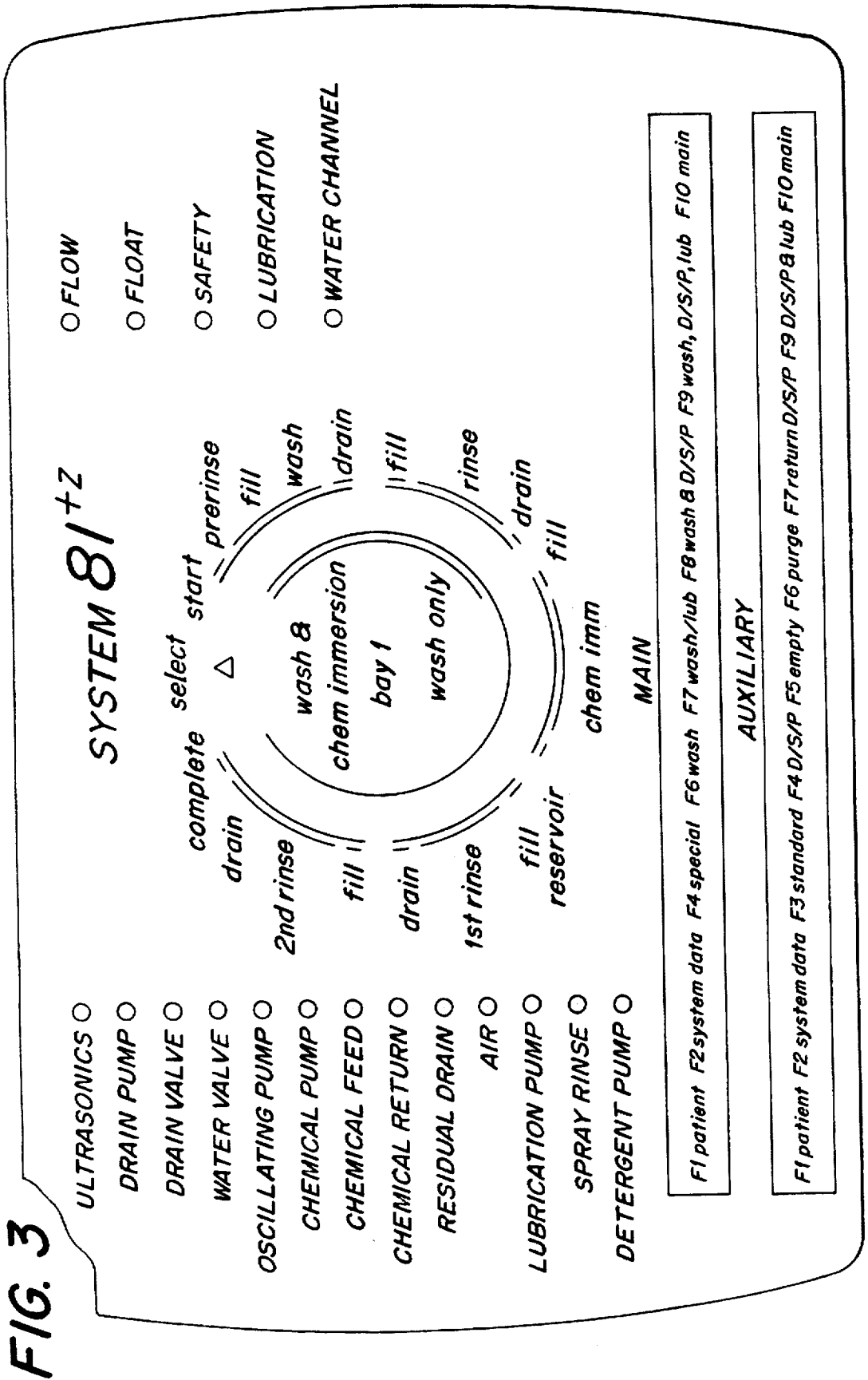
FIG. 3 is an illustration, similar to FIG. 2, but showing another exemplary screen display of the system of the present invention.
Figure 4:
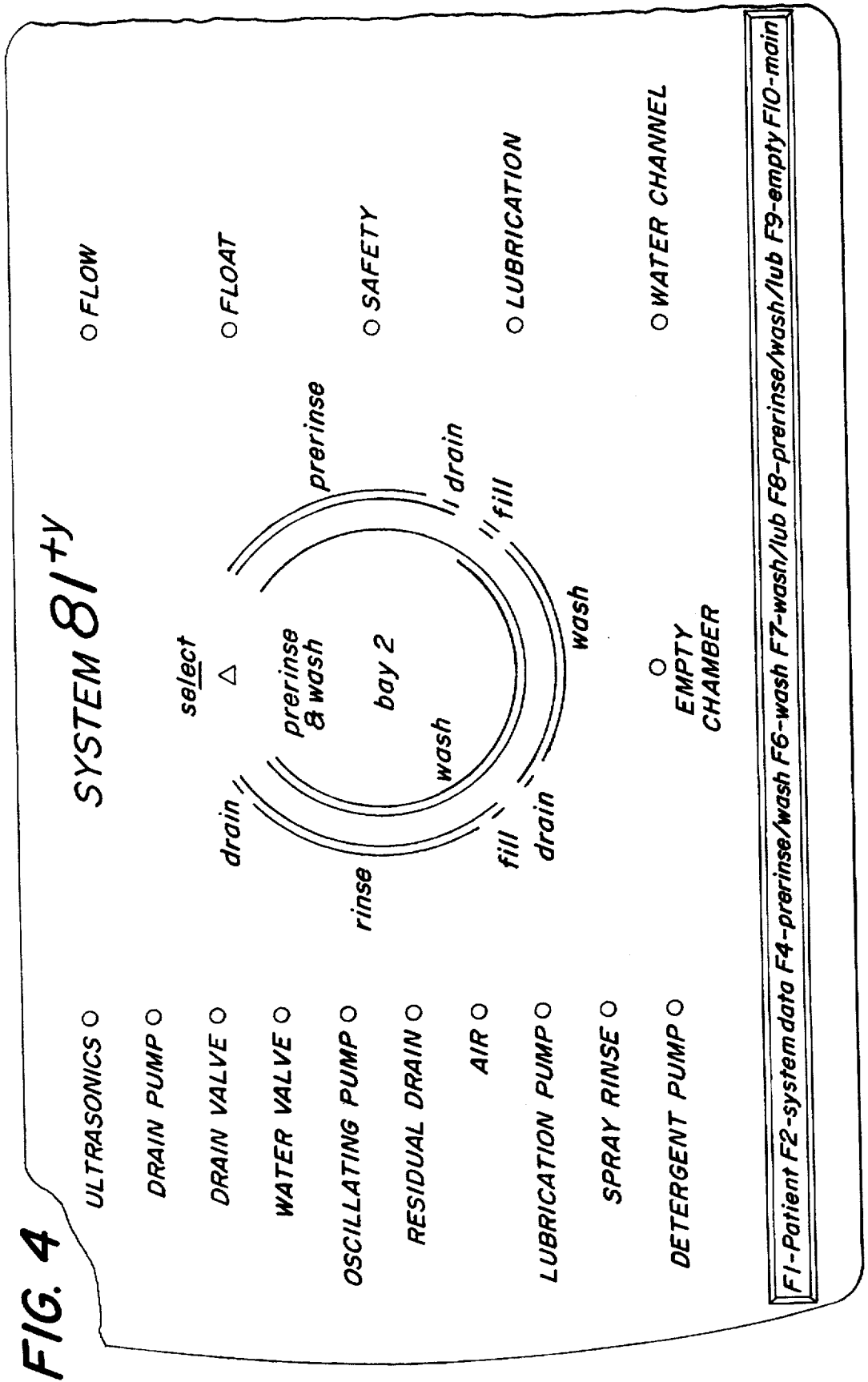
FIG. 4 is an illustration, similar to FIG. 2, but showing another exemplary screen display of the system of the present invention.
Figure 5:
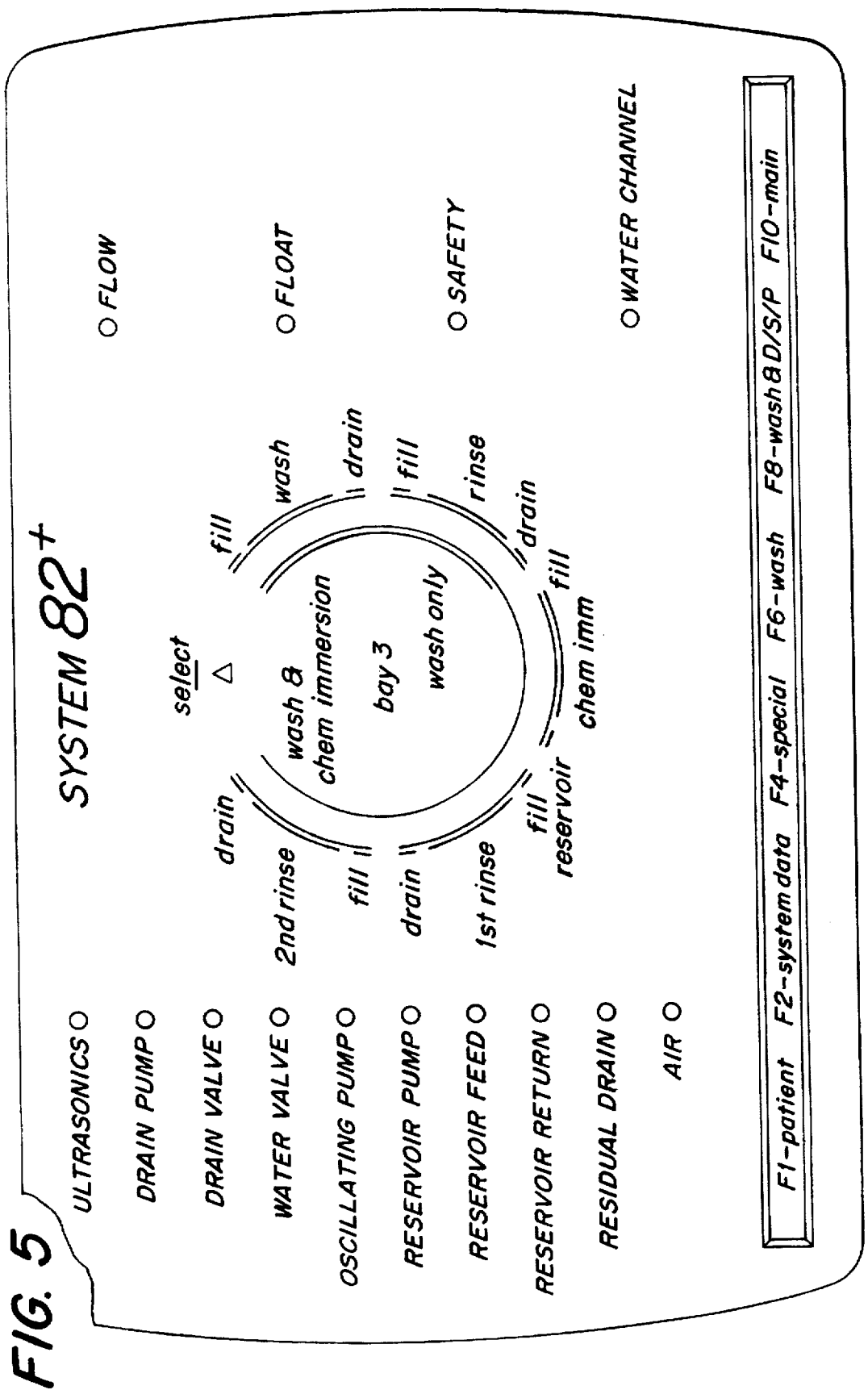
FIG. 5 is an illustration, similar to FIG. 2, but showing another exemplary screen display of the system of the present invention.

By utilizing the "cursor" arrows and "return" key of the keyboard 64, the user may select any one of the four bays appearing in FIG. 2. By selecting any one of the bays, the user will be presented with a full screen display of the operational status of the reprocessing unit constituting that bay. For example, by selecting the first bay in FIG. 2, the user will be presented with a full screen display of the first bay. That full screen display is shown in FIG. 3. Likewise, by cursoring on and selecting any of the remaining three bays, i.e., the second, third or fourth bays, the custom application software of the present invention will present the user with a full screen display of that bay. Full screen displays of the second 120, third 125 and fourth 128 bays depicted in FIG. 2 are shown in FIGS. 4, 5 and 6, respectively.

Figure 6:
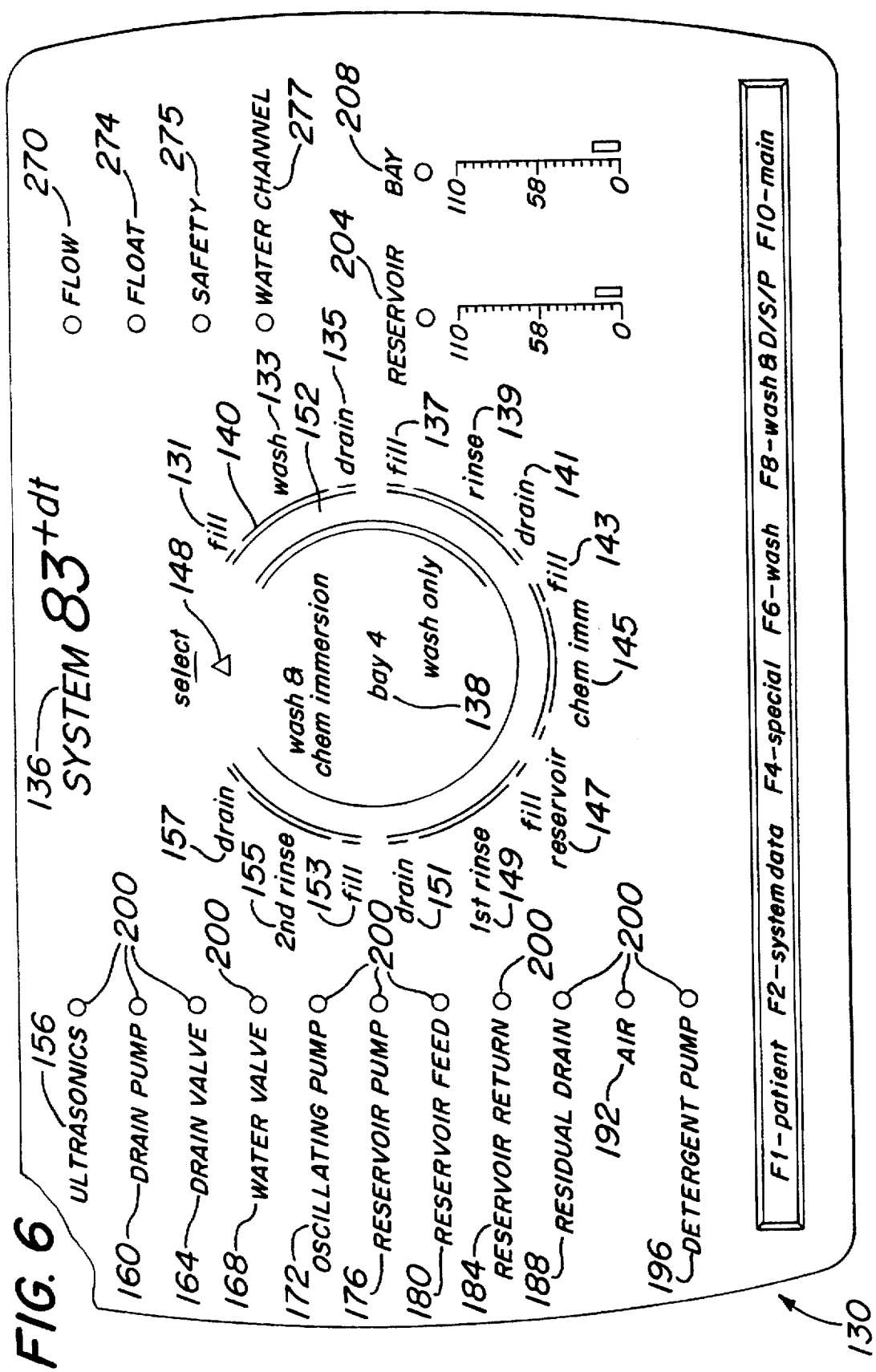
FIG. 6 is an illustration, similar to FIG. 2, but showing another exemplary screen display of the system of the present invention.

Referring now to FIG. 6 there is shown a full screen display 130 of the fourth bay of FIG. 2. This bay represents the operation of the reprocessing unit 80 (FIG. 1). As shown in FIG. 6, the screen display 130 comprises a "model identification field" 136. The model identification field 136 displays the model name of the reprocessing unit 80 being graphically displayed in that bay, e.g., System 83dt. The model designation set forth in the fourth bay herein is by way of example. It should be understood that the bays are in no way restricted to use of any particular type or model of reprocessing unit. Rather, any reprocessing unit bearing any model designation, including those manufactured by Custom Ultrasonics, Inc., and those manufactured by others could be utilized in any of the bays in accordance with this invention. The screen display 130 also includes a "bay identification field" 138 indicating which of the four bays of FIG. 2 is being displayed.

The screen display 130 is in the form of a circular dial 140 displaying fields representing the protocol of reprocessing steps performed by the reprocessing unit 80. In addition, the screen display shows the status of various components of the reprocessing unit. The protocol of reprocessing steps in this example includes "fill" 131, "wash" 133, "drain" 135, "fill" 137, "rinse" 139, "drain" 141, "fill" 143, "chemical immersion" 145, "fill reservoir" 147, "first rinse" 149, "drain" 151, "fill" 153, "second rinse" 155, and "drain" 157. The screen display 130 also comprises an indicator arrow 148 and a circular channel or path 152 through which the arrow moves. In particular, during operation of the reprocessing unit 80, the indicator arrow 148 travels continuously through the circular path or channel 152. As the reprocessing unit 80 performs the various steps in the reprocessing protocol, the indicator arrow 148 is aligned with sequential locations bearing respective legends or indica on the circular dial 140 indicating the particular reprocessing step being performed by the reprocessing unit, e.g., "start", "prerinse", "fill", "wash", etc. This enables the user to monitor the operation of the reprocessing unit 80 corresponding to this bay. The screen displays shown in FIGS. 3, 4 and 5 operate in a similar manner.

As mentioned above, the screen display 130 also includes a plurality of fields that correspond to various mechanical components located inside the reprocessing unit 80. These mechanical component fields include the "ultrasonics" field 156, the "drain pump" field 160, the "drain valve" field 164, the "water valve" field 168, the "oscillating pump" field 172, the "reservoir pump" field 176, the "reservoir feed" field 180, the "reservoir return" field 184, the "residual drain" field 188, the "air" field 192, and the "detergent pump field 196. Adjacent each component field is an illuminating indicator 200.

As will be described later, the mechanical components housed within the reprocessing unit 80 are activated during one or several of the steps in the reprocessing protocol. When a particular mechanical component of the reprocessing unit 80 is activated, the illuminating indicator 200 adjacent the field corresponding that component becomes illuminated, indicating to the user that the particular component is in use. For example, during each of the four drain cycles 135, 141, 151 and 157, a drain pump housed within the reprocessing unit 80 becomes operable to drain fluids from the reprocessing basin in a manner that will be explained in detail below. During the time that the drain pump is activated, the illuminating indicator 200 adjacent the drain pump field 160 of the screen display 130 is illuminated.

The screen display 130 also comprises a series of fields that relate to inputs provided by the reprocessing unit 80 to the microcomputer 32. These fields include "flow" 270, "float" 274, "safety" 275, and "water channel" 277. These functions will be described in detail later.

The screen display 130 also comprises a "reservoir temperature indicator" field 204 to indicate to the user the temperature of a chemical disinfectant located in the chemical reservoir of the reprocessing chamber 80, and a "bay temperature indicator" field 208 to indicate the temperature of fluid in the reprocessing basin of the unit 80.

At the bottom of FIG. 6, the screen display 130 presents the user with a list of menu options, i.e., "F1-Patient", "F2-System Data", "F4-Special", "F6-Wash", "F8-Wash & D/S/P" and "F10-Main". By selecting the "F1-Patient" option, the user may identify a particular load of medical instruments being reprocessed by patient name by inputting particular information about that patient, e.g., patient name, patient identification number via the keyboard. In particular, this information is keyed in each time a new load of medical instruments is reprocessed and becomes part of a database which can be recalled later. By selecting the "F2-System Data" option, the user may input information regarding the particular type of detergent or chemical disinfectant being utilized in the reprocessing unit 80. This option may also be utilized for viewing the operating parameters of the reprocessing unit 80, e.g., wash cycle time, first rinse cycle time, chemical disinfectant cycle time, second and third rinse cycle times, etc. These cycle times are preordained by the system 10 vendor and may not be altered by the user.

By selecting "F4-Special", the user may interrupt the operation of the reprocessing unit 80 in the event of a user error, e.g., some medical instruments may have been accidentally left out of the reprocessing chamber after the wash cycle began. The F4 command enables the user to interrupt the reprocessing cycle and start again.

The chemical disinfectant which is utilized in the reprocessing chamber 80 has a limited useful life. The "F4-Special" command also enables the user to purge outdated chemical disinfectant from the system 10 to enable disposal. By selecting option F6, the end user can run a portion of the entire reprocessing protocol, e.g., the wash cycle only, rather than the full protocol. By selecting "F8-Wash & D/S/P" at the bottom of screen display 130 in FIG. 6, the custom application software begins execution of the full protocol of reprocessing steps associated with the reprocessing unit 80. The details of the operation of reprocessing unit 80 will be discussed in detail hereinafter.

Figure 10:
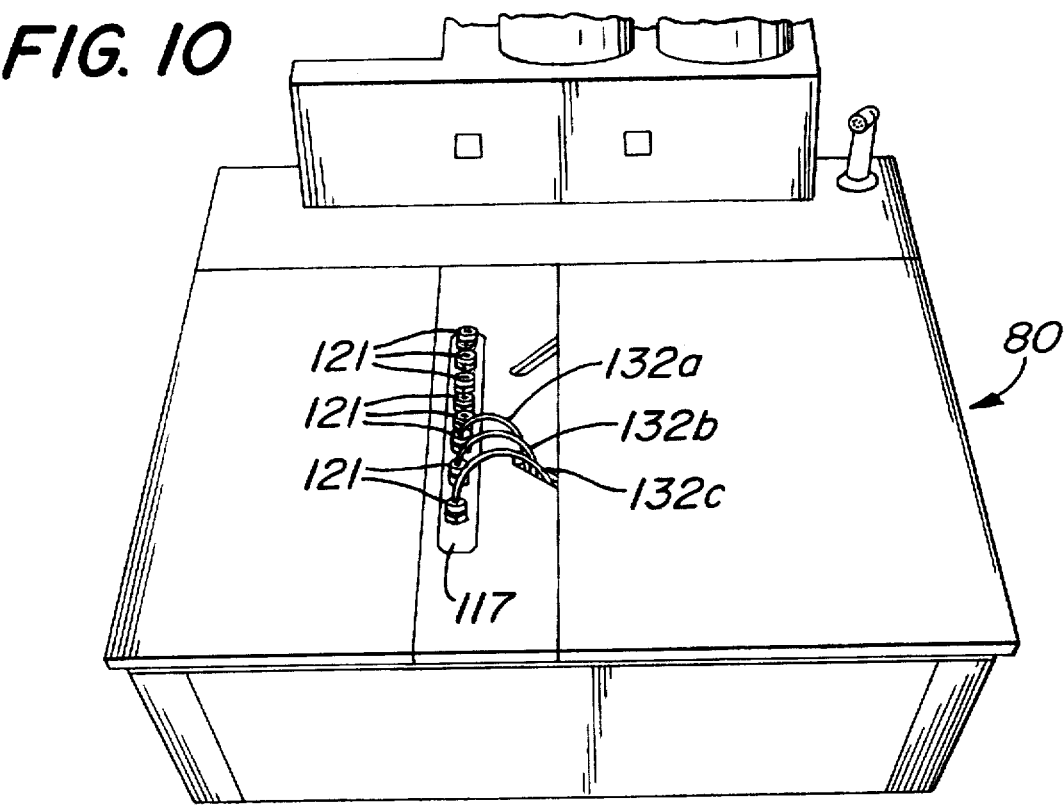
FIG. 10 is an enlarged isometric view of one of the reprocessing units of the system of the present invention.
Figure 11:
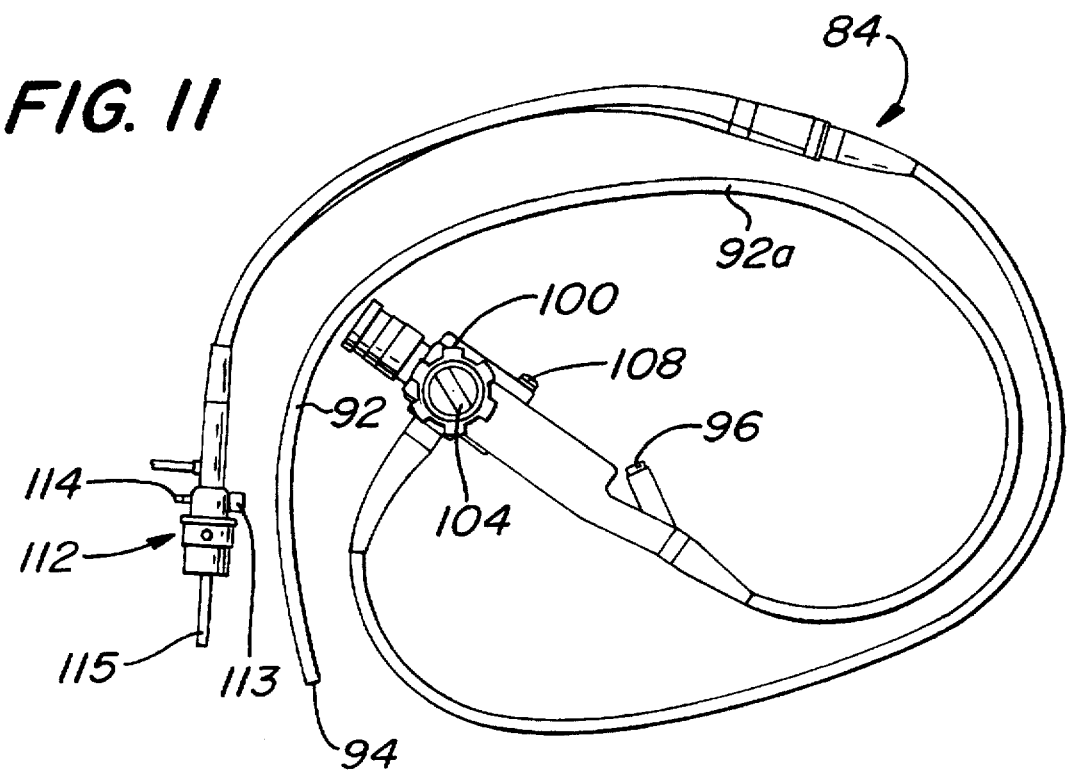
FIG. 11 is a top view of a flexible scope cleaned by utilizing the system of the present invention.

Referring now to FIG. 10, as previously mentioned, the reprocessing unit 80 is designed for reprocessing fiber optic scopes, such as an upper gastrointestinal scope 84. Referring now to FIG. 11, it can be seen that the scope 84 includes an insertion tube 92 having an outer surface 92a and a distal end 94. The insertion tube 92 is arranged to be inserted into the gastrointestinal tract of a patient during a procedure utilizing the scope 84. The scope 84 also includes an "umbilicus" portion 112 having an air/water port 113 for attachment to air and water sources, a suction port 114 for attachment to a suction source, and a prong 115 for attachment to a light guide for fiber optics capability. The air/water port 113 and the suction port 114 are both in communication with an Internal channel (not shown) that extends the entire length of the scope to distal end 94 to enable irrigation, positive air pressure and suction capability as required at particular sites of interest in the patient's gastrointestinal tract. The application of air and water is controlled by the air/water button 108. Another button (not shown) controls suction. Additionally, the scope is provided with a biopsy port 96 for the insertion of a biopsy forceps (not shown). This forceps is provided for removal of biological materials, e.g., polyps, from the gastrointestinal tract wall. The biopsy port 96 is in communication with an internal biopsy channel (not shown) that extends from the biopsy port 96 to the distal end 94. The distal end of the biopsy forceps is inserted through the biopsy port 96 of the scope 84, extends through the internal biopsy channel and beyond the distal end 94 of the insertion tube 92. The distal end of the biopsy forceps is controlled by means of outer control knob 100 and an inner control knob 104.

During use, the scope 84 including its inner and outer surfaces, its parts, e.g., knobs and buttons, and all accessories used with the scope 84, e.g., biopsy forceps, snares, etc., become contaminated as the result of contact with bodily contaminants. Thorough cleaning of the scope 84 involves the removal of all adherent visible and invisible contaminants, e.g., gastric juices, blood, protein, microorganisms, from all external and internal surfaces and parts of the scope before reuse.

Figure 12:
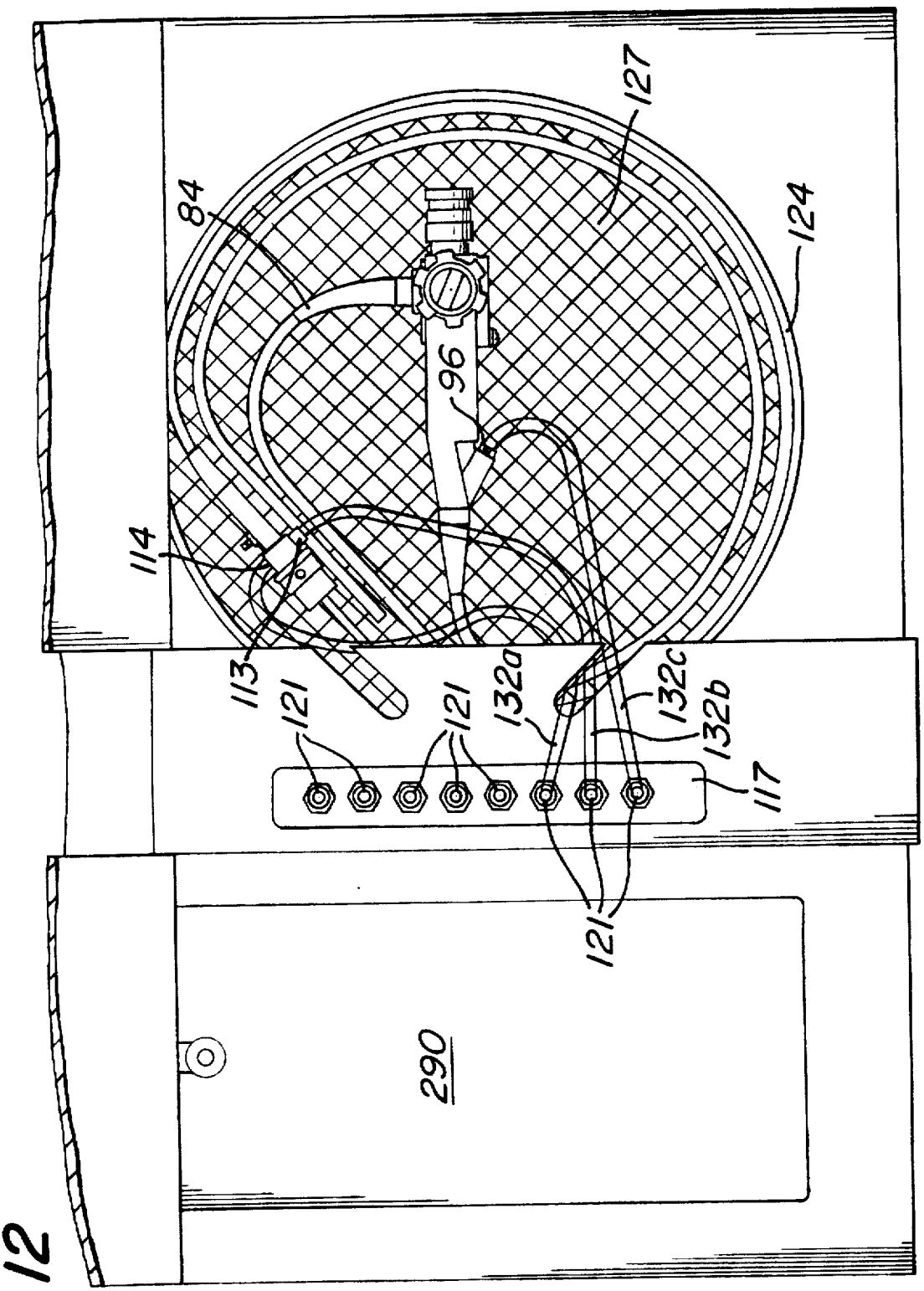
FIG. 12 is an enlarged top plan view of one of the reprocessing units of the present invention shown in FIG. 1 with covers removed.

Referring now to FIG. 12, it can be seen that the reprocessing unit 80 includes an external manifold 117 comprising a plurality of ports 121 and a circular reprocessing basin 124. An instrument carrier 127, e.g., a circular mesh-like basket, is removably seated within the basin 124. For reprocessing, the scope 84 is placed within the instrument carrier 127. A first tubing segment 132a is connected at one end to one of the ports 121 of manifold 117 and at its second end to the suction port 114 of the scope 84. A second tubing segment 132b is connected at one end to port 121 and at its second end to the air/water port 113. A third tubing segment 132c is connected at its first end to one of the ports 121 and at its second end to biopsy port 96. Connection of the tubing segments to the ports 96, 113 and 114 enables the circulation of detergent and chemical disinfectants through the interior channels of the scope 84 in a manner to be described in further detail below.

Figure 13:
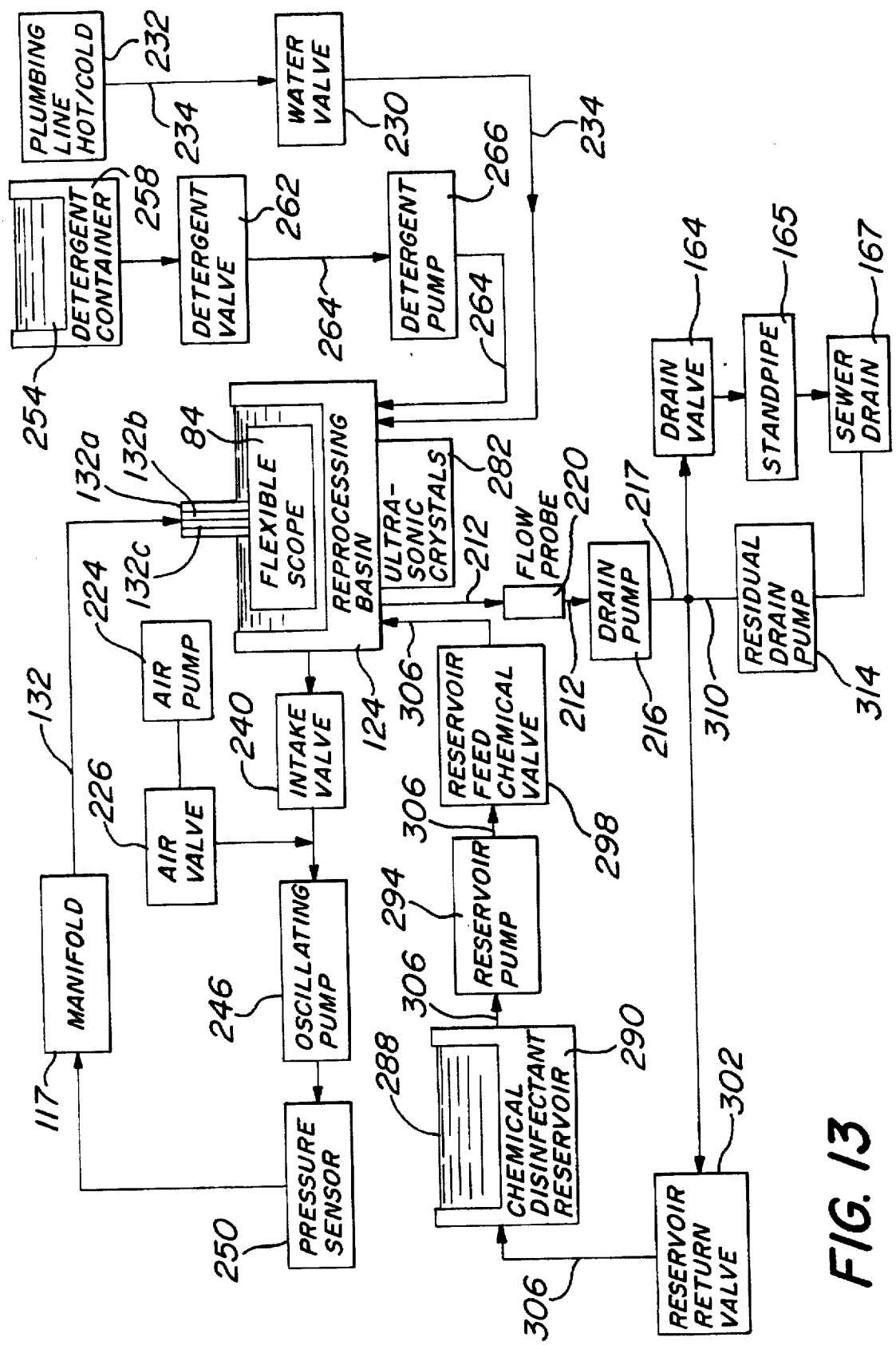
FIG. 13 is a schematic/block diagram illustrating the operation one of the reprocessing units of the present invention.

Referring now to FIGS. 6 and 13, the wash cycle comprises the reprocessing steps of "fill" 131, "wash" 133, and "drain" 135. During the step of "fill" 131, in response to commands received from the computer 32 using the custom application software, a solenoid-type water valve 230 is placed in an "open" position to enable water to flow from an outside hot/cold water source 232 through a water line 234, into the reprocessing basin 124 to immerse the scope 84. The reprocessing basin 124 is provided with a drain (not shown) located in the bottom of the reprocessing basin 124. The drain is connected to a drain line 212. During the fill step 131, as wash water flows into the reprocessing basin 124 it begins to drain down drain line 212. A drain valve 164, provided below the drain line 212 is normally in a "closed" state to prevent the draining of the water out of the system. This action enables the filling of the reprocessing basin 124.

A flow probe 220 is located adjacent the drain line 212 and is operative to detect the presence of moisture as wash water begins to fill the drain line 212 during filling of the reprocessing basin 124. Once the probe 220 detects the presence of moisture, the probe 220 sends a signal indicative thereof to the computer 32 which causes the circular indicator 200 of the video display corresponding to the "flow field" 270 (See FIG. 6) to illuminate, thereby indicating to the user that the reprocessing basin 124 is filling with water. Additionally, an operational float (not shown) is located within the reprocessing basin 124. During filling, the operational float is buoyed upwardly and eventually reaches a predetermined height corresponding to a particular volume of wash water being present in the reprocessing basin 124. When the operational float reaches this predetermined level, the reprocessing unit 80 sends a signal to the microcomputer 32 which in turn causes the illumination of the circular indicator 200 corresponding to the operational float field 274. By illuminating the indicators 200 corresponding to the flow 270 and float 274 fields, the system 10 indicates to the user that the wash basin has been filled and that the next step in the protocol, i.e., washing, may begin. Thereafter, the microcomputer 32 provides an electrical signal to close the water valve 230 so no additional wash water enters the reprocessing basin 124.

As wash water fills into the reprocessing basin 124 over the immersed scope 84, a solenoid-type detergent valve 262 and a detergent pump 266 forming a portion of the system 10 operate to withdraw a predetermined amount, e.g., three ounces, of detergent 254 from a detergent container 258 located adjacent the reprocessing unit 80 (also shown in FIG. 1) and inject that predetermined amount of detergent into the reprocessing basin 124 through a detergent line 264. The detergent 254 may be of any suitable composition. One particularly effective type of detergent is sold under the trademark TERGAL 800 by Custom Ultrasonics, Inc.

During the wash step 133, the oscillating pump 246 is activated by the microcomputer 32 draw the water/detergent mixture contained in the reprocessing basin 124 through an intake valve 240 and to circulate the mixture through the pressure sensor 250, the ports 121 of the manifold 117, the tubing segments 132a, 132b and 132c, and through the internal channels (not shown) of the immersed scope 84. Once the water/detergent mixture has passed through the internal channels of the immersed scope 84, it flows back into the reprocessing basin 124 where it is again recirculated by the oscillating pump 246 for a predetermined minimum period of time based upon guidelines provided by the detergent manufacturer, e.g., one-hundred eighty seconds. During the wash step 133, ultrasonic crystals 282 located below the reprocessing basin are activated under control of the microprocessor. When activated, these ultrasonic crystals 282 generate ultrasonic vibrations that act in combination with the detergent-water mixture to cause a cleansing action that breaks down, loosens and removes contaminants from the exterior and interior surfaces of the flexible scope 84 to provide enhanced cleaning.

The pressure sensor 250 is a safety device that is provided adjacent: the oscillating pump 246 to read water pressure at the output end of the oscillating pump 246. In the event that no water pressure is detected by the pressure sensor 250 during the wash step 133, such as in the case where the oscillating pump 246 fails, the pressure sensor 250 acts to close down the system 10. In particular, an error signal is sent by the sensor to the microcomputer 32 which in turn causes an indicator 200 adjacent the safety field 275 on screen 130 to illuminate. This visual signal serves to prevent a user from removing a contaminated scope from the reprocessing unit 80 under the mistaken belief that the scope has been cleaned.

Once the predetermined time period for the wash step 133 has elapsed, the drain step 135 begins. During the drain step 135, the drain valve 164 is opened and the drain pump 216 is activated under control of the microprocessor. While the oscillating pump 246 continues to pump the water/detergent mixture through the scope 84, the mixture begins to drain out of the reprocessing basin 124 by means of the drain pump 216 which pumps the water/detergent mixture down the drain line 212 and into a T-assembly 217. The mixture travels through drain valve 164, through a standpipe 165 and into a sewer drain 167. Once the flow probe 220 detects the absence of moisture in the drain line 212, it sends a signal to the microcomputer 32 that in turn shuts off the drain pump 216 and returns the drain valve 164 to the closed position.

Subsequent to shutting off the drain pump 216, the microcomputer 32 activates an air pump 224 and opens a solenoid-type air valve 226. By use of the air pump 224 forced air is directed through the oscillating pump 246, the pressure sensor 250, the manifold assembly 117, the tubing segments 132a, 132b and 132c and through the internal channels of the scope 84. The forced air acts to purge and clear away any residual water/detergent mixture remaining in the interior channels of the scope 84. The purged residual water/detergent mixture flows down the drain line 212 located below the reprocessing basin 124 and collects in the bottom of the T-assembly 217 located below the drain line 212. The purged residual water/detergent mixture is removed from the bottom of the T-assembly 217 by means of a residual drain line 310 and a residual drain pump 314 that is activated simultaneously with the air pump 224 by the microprocessor.

The first rinse cycle comprises the steps of "fill" 137, "rinse" 139 and "drain" 141 as shown on the dial 140. During the fill step 137, water is introduced into the reprocessing basin 124 from the outside source 232 by means of water valve 230 and water line 234 in a manner similar to the fill step 131. Since this is a rinse cycle, as opposed to a wash cycle, no detergent 254 is introduced during the fill step 137. During the rinse step 139, the oscillating pump 246 draws the rinse water contained in the reprocessing basin 124 through the intake valve 240 and recirculates the rinse water for a predetermined minimum period of time in a manner as previously described above in connection with the wash step 133. Also, during the rinse step 139, the ultrasonic crystals 282 are activated. Thereafter, the drain step 141 begins. During the drain step 141, rinse water is pumped out of the reprocessing basin 124 by the drain pump 216. The water travels down the drain line 212 through the drain pump 216 and into the T-assembly 217. Because the drain valve 164 is in the opened position, the water travels through drain valve 164 and through standpipe 165 and into a sewer drain 167. Once the flow probe 220 detects the absence of moisture in the drain line 212, it sends a signal to the microcomputer 32 that in turn shuts off the drain pump 216. Some residual water remains in the bottom of the T-assembly 217 that cannot be removed by the drain pump 216. This residual rinse water is removed from the bottom of the T-assembly 217 by means of the residual drain line 310 and the residual drain pump 314 in the manner previously described. By removing all residual rinse water from the T-assembly 217, chemical disinfectant introduced in the next step of the protocol will not become diluted with any residual rinse water.

Once the drain step 141 is complete and all residual rinse water has been removed from the T-assembly 217, the "fill" step 143 begins and a chemical disinfectant 288 is introduced into the reprocessing basin 124. One particularly effective type of chemical disinfectant is 2% or 3% glutaraldehyde which is marketed by a number of different companies under various brand names such as Cidex manufactured by Johnson & Johnson. The introduction of the disinfectant 288 is effected by the microcomputer 32 which sends a signal to open a reservoir feed valve 298 and to cause a reservoir pump 294 to pump the chemical disinfectant 288 from a chemical disinfectant reservoir 290 through a chemical line 306 into the reprocessing basin 124. The chemical disinfectant 288 enters and fills the reprocessing basin 124 to a predetermined height in a manner similar to that previously described in the fill 131 step.

Once the reprocessing basin 124 has been filled with the chemical disinfectant 288 to the predetermined level, the oscillating pump 246 is activated under control of the microcomputer 32 and acts to draw the chemical disinfectant 288 contained in the reprocessing basin 124 through the intake valve 240. This action circulates the chemical disinfectant 288 through the pressure sensor 250, the ports of manifold 117, the tubing segments 132a, 132b and 132c, and through the internal channels of the immersed scope 84. Once the chemical disinfectant 288 has passed through the internal channels of the immersed scope 84, it flows back into the reprocessing basin 124 where it is recirculated by the oscillating pump 246 for a predetermined minimum period of time based upon guidelines provided by the manufacturer of the chemical disinfectant 288. Once the predetermined minimum time period for the chemical immersion step 145 has elapsed, the microcomputer 32 sends a signal to the oscillating pump 246 to turn it off.

Thereafter, the chemical disinfectant 288 is returned to the chemical disinfectant reservoir 290 for reuse. To enable the return of the chemical disinfectant 288 to the reservoir 290, the microcomputer 32 sends signals closing the drain valve 164 and opening the reservoir return valve 302. The drain pump 216 is activated and the chemical disinfectant 288 is pumped through the chemical line 306, through the reservoir return valve 302 and back into the chemical reservoir 290. Once the flow probe 220 detects the absence of moisture in the drain line 212, it sends a signal to the microcomputer 32, that in turn shuts off the drain pump 216.

Thereafter, two additional rinse cycles are performed. The first rinse cycle comprises first rinse 149 and drain 151. This rinse cycle is performed in a manner similar to the first rinse cycle, i.e., fill 137, rinse 139 and drain 141, however, this rinse cycle does not include use of the residual drain line 310 and residual drain pump 314. The ultrasonic crystals 282 are activated during the rinse step 149 of this rinse cycle. The second rinse cycle comprises fill 153, second rinse 155 and drain 157. This rinse cycle is performed in a manner similar to the first rinse cycle, i.e., fill 137, rinse 139 and drain 141, and includes use of the residual drain line 310 and residual drain pump 314. The ultrasonic crystals 282 are activated during the rinse step 151 of this rinse cycle. Once this rinse cycle has been completed, the reprocessing protocol is complete and the flexible scope may be removed from the reprocessing chamber 80 for reuse.

The reprocessing units 68, 72 and 76 of the system 10 operate in manners that are similar to the operation of reprocessing unit 80. For example, the reprocessing unit 68 is arranged for the reprocessing of contaminated surgical instruments, e.g., scissors, and other types of surgical instruments, including those having internal surfaces, such as trocars and catheters. Since many types of surgical instruments, such as scissors have moving parts, the reprocessing units 68 provides a lubrication step in addition to the wash, rinse and chemical immersion steps described heretofore. Thus, as shown in FIG. 1, the reprocessing unit 68 also includes a lubricant container 62 in addition to the detergent container 61.

The reprocessing unit 72 is similar in construction to reprocessing unit 68 and is also arranged for the reprocessing of contaminated surgical instruments. In this regard, unit 72 also includes a detergent container 63 and a lubricant container 65. The reprocessing units 68 and 72 includes hinged covers 69 and 71, respectively. Each cover is arranged to be lifted to provide access to interior of the reprocessing basin and instrument carrier.

Figure 7:
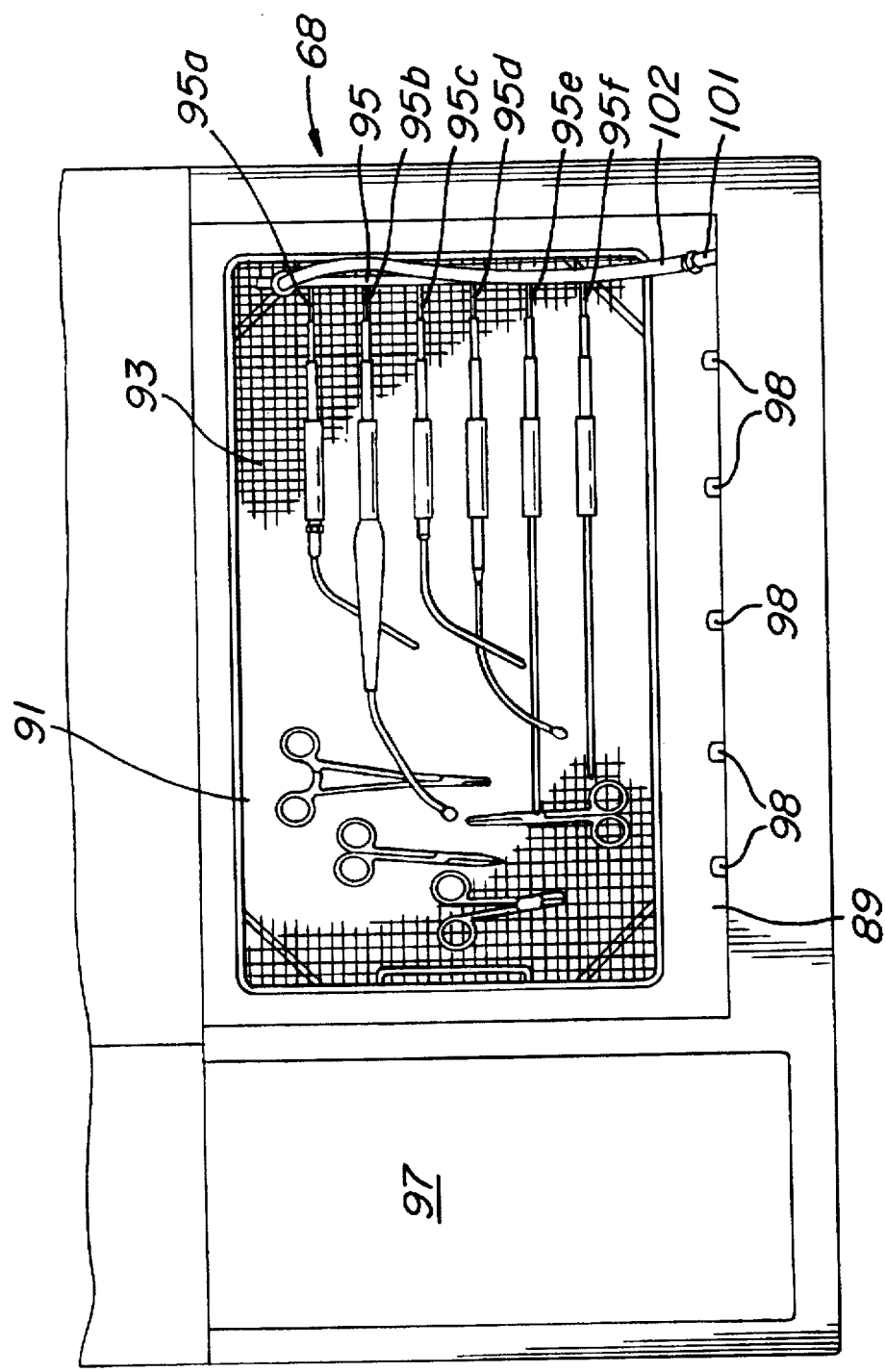
FIG. 7 is an enlarged top plan view of one of the reprocessing units shown in FIG. 1, with the covers in the opened position.

Referring now to FIG. 7, there is shown a top view of the reprocessing unit 68 with the cover 69 placed in the open position. As can be seen the reprocessing unit 68 includes a reprocessing basin 89, an instrument carrier 91, and a chemical disinfectant reservoir 97. The instrument carrier 91 is shown seated within the reprocessing basin 89. The instrument carrier 91 is generally rectangular in shape and comprises a mesh-like bottom 93 which is arranged to hold surgical instruments during reprocessing. In FIG. 7 surgical instruments are shown placed in the instrument carrier 91. The instrument carrier 91 also includes a manifold assembly 95 having a plurality of ports 95a, 95b, 95c, 95d, 95e and 95f, each of which is shown connected to a respective surgical instrument having an internal surface. The manifold assembly 95 is connected to a port 101 by means of a tubing segment 102. The reprocessing unit 68 is controlled from the microcomputer 32 and operates in response to a protocol of cleaning steps (shown in FIG. 3) in a manner similar to that described in connection with the reprocessing chamber 80.

The manifold assembly shown in FIG. 7 operates in conjunction with the reprocessing unit 68 to decontaminate internal surfaces of surgical instruments in a manner that is similar to that described in connection with the decontamination of the internal surfaces of scopes in the reprocessing unit 80. That is, during wash, rinse and chemical immersion phases of the reprocessing protocol, an oscillating pump (not shown) located within the reprocessing unit 68 operates to draw fluid, e.g., wash water, rinse water or chemical disinfectant, from the reprocessing basin 89, circulate that fluid through the port 101 and the manifold assembly 95 and through the internal surfaces of the surgical instruments disposed on the instrument carrier 91 to effect the decontamination process. The reprocessing chamber 68 is also provided with a plurality of spray nozzles 98 that are operative during the rinse cycle under control of the microprocessor.

Figure 8:
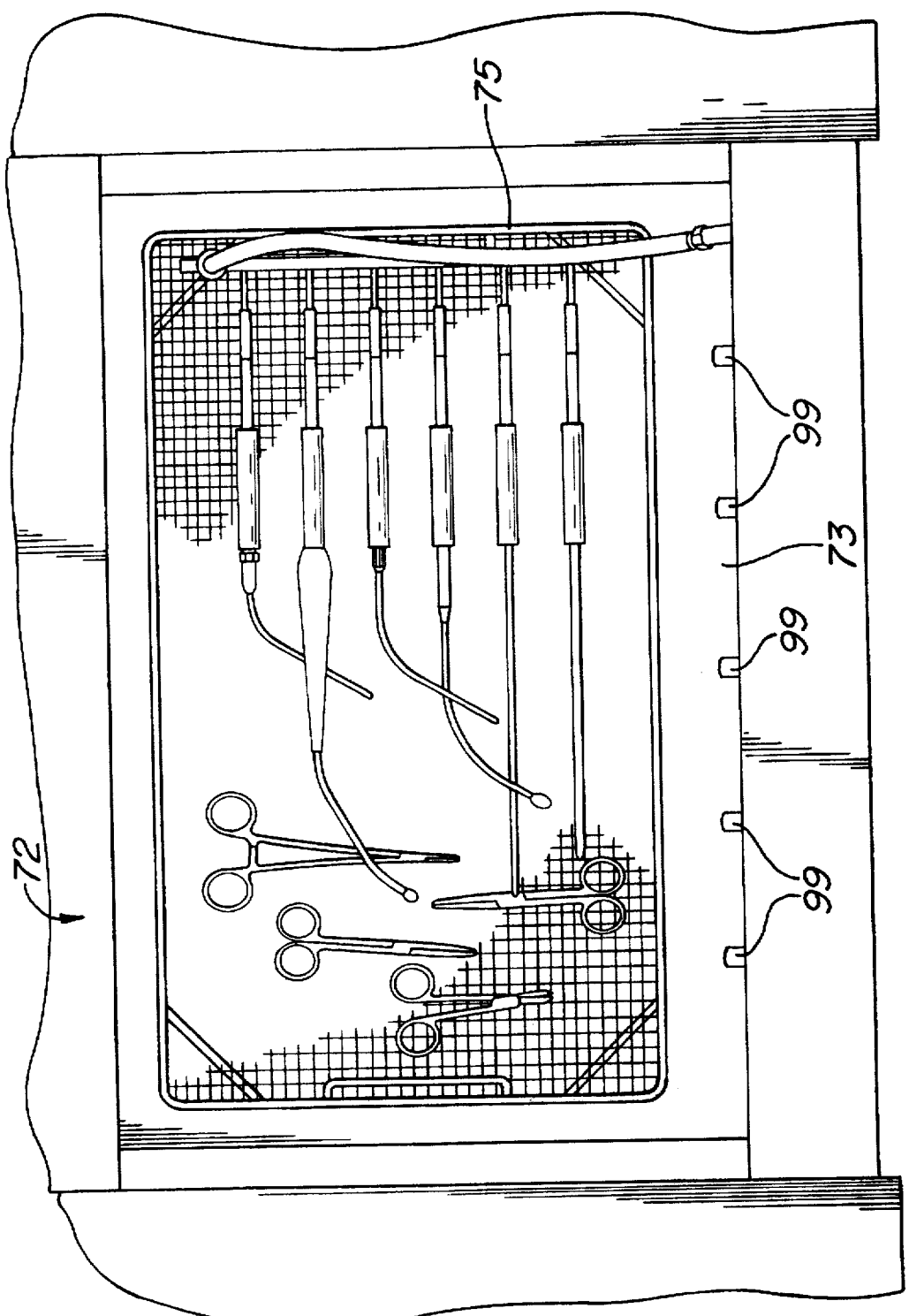
FIG. 8 is an enlarged top plan view of another one of the reprocessing units shown in FIG. 1 with the covers in the opened position.

Referring now to FIG. 8, there is shown a top view of the reprocessing unit 72 with the cover 71 placed in the open position. The reprocessing unit 72 comprises a reprocessing basin 73 in which an instrument carrier 75 is disposed. As shown in FIG. 8, the instrument carrier 75 is generally similar in construction to the instrument carrier 91 (FIG. 7) used in connection with reprocessing unit 68 in that it comprises a manifold assembly having a plurality of ports for connection to respective surgical instruments, and is arranged to hold the surgical instruments during their reprocessing. The manifold assembly shown in FIG. 8 operates in conjunction with the reprocessing unit 72 to decontaminate internal surfaces of the surgical instruments in a manner that is similar to the manifold assembly 95 described in connection with reprocessing unit 68. The reprocessing chamber 72 is also provided with a plurality of spray nozzles 99 that are operative during the rinse cycle under the control of the microcomputer 32.

Figure 9:
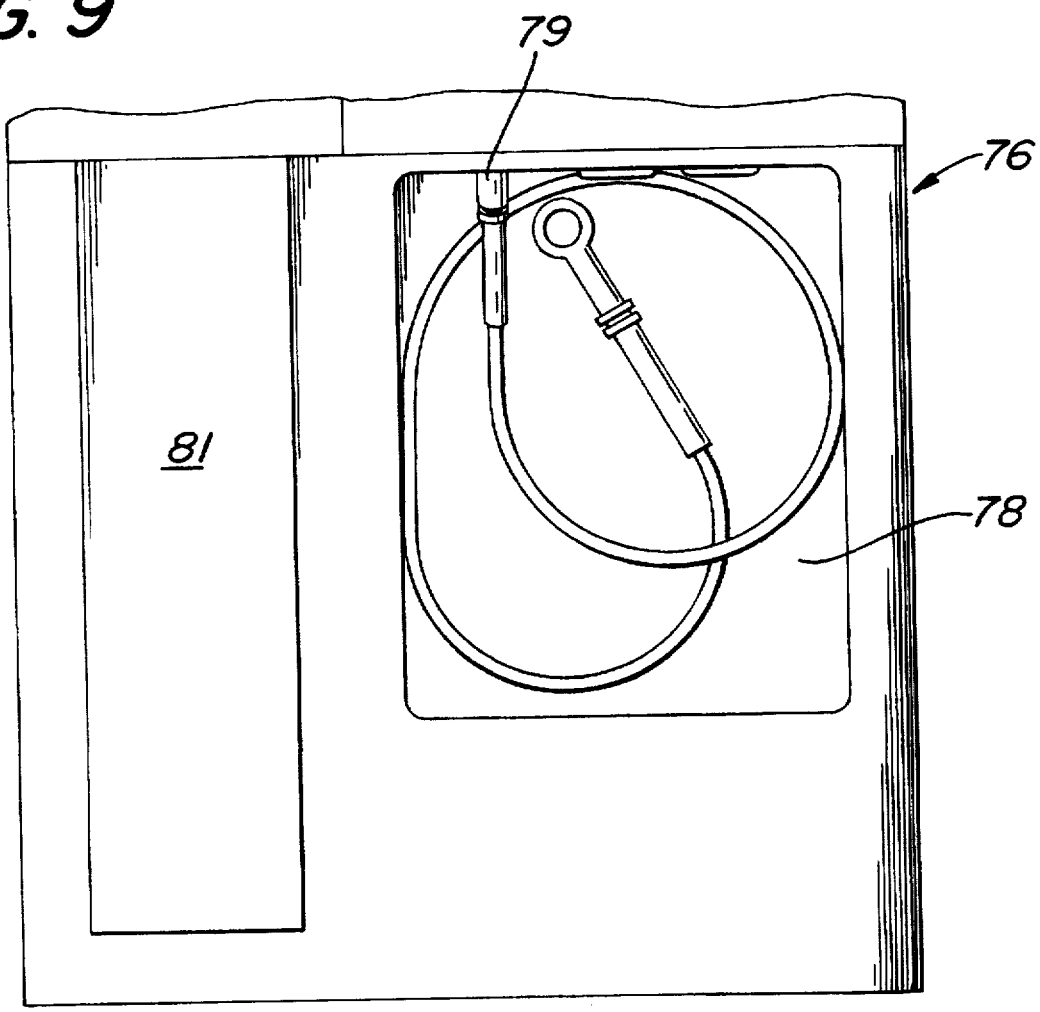
FIG. 9 is an enlarged top plan view of another one of the reprocessing units shown in FIG. 1 with the covers removed.

Referring now to FIGS. 1 and 9, the reprocessing unit 76 is designed for the reprocessing of accessories used with flexible scope 84, e.g., biopsy forceps, snares, buttons, bite blocks, valves etc. The reprocessing unit 76 comprises a hinged cover 77 that may be lifted to provide access to a reprocessing basin 78 located within the reprocessing unit 76. The reprocessing unit 78 operates in response to a protocol of cleaning steps (shown in FIG. 5) in a manner similar to that described in connection with the reprocessing unit 80. Referring now to FIG. 9, there is shown a top view of the reprocessing unit 76 with the cover 77 placed in the open position. The reprocessing unit 76 comprises a reprocessing basin 78 in which accessories may be placed, and a chemical disinfectant basin 81. The reprocessing basin 78 also comprises a port 79 which may be utilized for decontaminating flexible scope accessories having internal surfaces, such as biopsy forceps. FIG. 9 shows a biopsy forceps attached to the port 79.

As previously stated, the system 10 of the present invention comprises a database of information relating to reprocessing. Referring again to the list of menu options, i.e., MASTER DATA, RUN CU, REPORTS and MISCELLANEOUS, by selecting the MASTER DATA option, various types of information may be stored and retrieved on the system 10. For example, the user may store or retrieve information relating to a doctor, and link that information with a particular load of medical instruments being reprocessed by the system 10. Such information may include the doctor's name and identification number. The user may also store and retrieve information relating to each particular instrument being reprocessed by each reprocessing unit in the system 10. Such information includes instrument type, serial number and date or dates on which the instrument was reprocessed. By retaining such information in the database, the system 10 provides a historical record of the instrument's reprocessing. Such a historical record is often valuable in determining whether a particular instrument is the source of contamination. Additionally, the user may input, i.e., key in, information relating to the detergents and chemical disinfectants being utilized in each of the reprocessing units in the system 10, including brand name or generic name of the various detergents and chemical disinfectants.

By selecting the REPORTS option, the user may produce various reports relating to reprocessing historical data. For example, by providing a date range, e.g., Sep. 11, 1995 through Sep. 12, 1995, and a patient identification, the user may determine the particular reprocessing steps that were performed on medical instruments used in a procedure for that patient and the particular serial numbers of those medical instruments. Also, by inputting the serial number of a particular medical instrument, the user may produce a report setting forth all of the reprocessing details relating to that instrument, e.g., dates of reprocessing and reprocessing steps performed. The reports option also enables the user to export data from the database of the system 10 onto other conventional databases.

The MISCELLANEOUS option enables one to set various operating parameters relating to each of the reprocessing units in the system. Use of this option is not made available to end users, e.g., hospital workers, but rather is intended only to be utilized by the vendor of the system 10 in accordance with manufacturers' and governmental guidelines. The various parameters that may be set or adjusted in the MISCELLANEOUS option include wash cycle time, rinse cycle time, chemical immersion cycle time, detergent injection delay time, reservoir fill cycle time, etc. These parameters may be adjusted in each of the bays in which the reprocessing units are located.

Without further elaboration, the foregoing will so fully illustrate our invention that others may, by applying current or future knowledge, readily adapt the same for use under the various conditions of service.

What is claimed is:

1. An integrated system for reprocessing contaminated medical instruments, said system comprising:
 (a) a first reprocessing unit and a second reprocessing unit, said first and second reprocessing units being capable of operating at the same time, each of said first and second reprocessing units being adapted for receiving therein a medical instrument carrier, said medical instrument carrier being adapted to receive at least one of a predetermined type of contaminated medical instruments for the reprocessing thereof;
 (b) electronic controller means including electronic processor means and associated memory means, said controller means being operably coupled to each of said first and second reprocessing units to enable simultaneous and/or individual control of the operation of said first and second reprocessing units;
 (c) a control program for said controller means for disposition in said memory means, said control program establishing respective protocols of processing steps for effecting the reprocessing of the medical instruments in each of said first and second reprocessing units, said respective protocols being preestablished in accordance with the specific type of medical instrument to be reprocessed in the associated reprocessing unit; and,
 (d) said respective protocols comprising a first protocol of processing steps for effecting the reprocessing of contaminated medical instruments in said first reprocessing unit and a second protocol of processing steps for effecting the reprocessing of contaminated medical instruments in said second reprocessing unit, said first protocol of processing steps being different from said second protocol of processing steps.

2. The system of claim 1 additionally comprising visual display means for providing a visual display of various operating conditions of said system.

3. The system of claim 2 wherein said visual display means comprises a portion of said electronic controller means.

4. The system of claim 3 wherein said visual display means is arranged to produce a graphical display showing operating conditions of said system.

5. The system of claim 1 additionally comprising input means for enabling a user of said system to provide information into said system to effect the operation thereof.

6. The system of claim 1 additionally comprising a database containing reprocessing related information, said database being stored within said system for enabling the retrieval of selected information therefrom.

7. The system of claim 6 wherein said reprocessing related information comprises information relating to the instruments previously reprocessed by said system.

8. The system of claim 1 wherein said electronic controller means comprises a housing for disposition at a location remote from said reprocessing units.

9. The system of claim 1 wherein said electronic controller means enables the monitoring of the operation of each of said reprocessing units, as each of said reprocessing units is operated under the control of said electronic controller means.

10. The system of claim 9 wherein said electronic controller means additionally comprises visual display means for providing a visual display of operating conditions of said system.

11. The system of claim 10 wherein said visual display means is arranged to selectively produce a graphical display of the operating conditions of each of said reprocessing units of said system.

12. The system of claim 11 wherein said visual display means is arranged to selectively produce a graphical display of the operating conditions of all or selected ones of said reprocessing units of said system as said processing units are operated by said electronic controller means.

13. The system of claim 1 wherein said control program for establishing respective protocols of processing steps for effecting the reprocessing of the medical instruments in each of said reprocessing units is alterable within said memory.

14. The system of claim 1 wherein each of said reprocessing units comprises plural components selected from the group consisting of valves, sensors, pumps, and solenoids.

15. The system of claim 14 wherein at least some of said plural components of said reprocessing units is arranged to be in electrical communication with said electronic processor means.

16. The system of claim 15 additionally comprising electrical interface means coupled between said electronic processor means and at least some of said plural components of said reprocessing units.

17. The system of claim 1 wherein said first reprocessing unit is arranged for reprocessing flexible scopes and said second reprocessing unit is arranged for reprocessing surgical instruments.

18. The system of claim 17 additionally comprising a third reprocessing unit arranged for reprocessing flexible scope accessories.

19. The system of claim 1 wherein said electronic controller means additionally comprises a monitor and a graphical user interface, and wherein said graphical user interface displays a screen display on said monitor comprising a plurality of bays, each of said bays comprising a graphical illustration of the operation of a respective one of said reprocessing units of said system.

20. The system of claim 1 wherein said electronic controller means additionally comprises a printer.

21. The system of claim 1 wherein said medical instrument carrier is rectangular.

22. The system of claim 1 wherein said instrument carrier is circular.

23. The system of claim 1 wherein said instrument carrier additionally comprises an attachment means for attachment to a medical instrument having an internal surface and means for attachment to one of said plurality of reprocessing units.

24. The system of claim 1 wherein said protocol of reprocessing steps comprises at least one wash cycle and at least one rinse cycle.

25. The system of claim 24 wherein said protocol of reprocessing steps additionally comprises at least one chemical immersion cycle.

26. The system of claim 13 wherein said protocol of reprocessing steps additionally comprises at least one cycle for the application of a lubricant.

* * * * *